Aug. 11, 1925.
J. N. CLORE
1,548,869
LUBRICATING DEVICE
Filed March 18, 1924      2 Sheets-Sheet 1
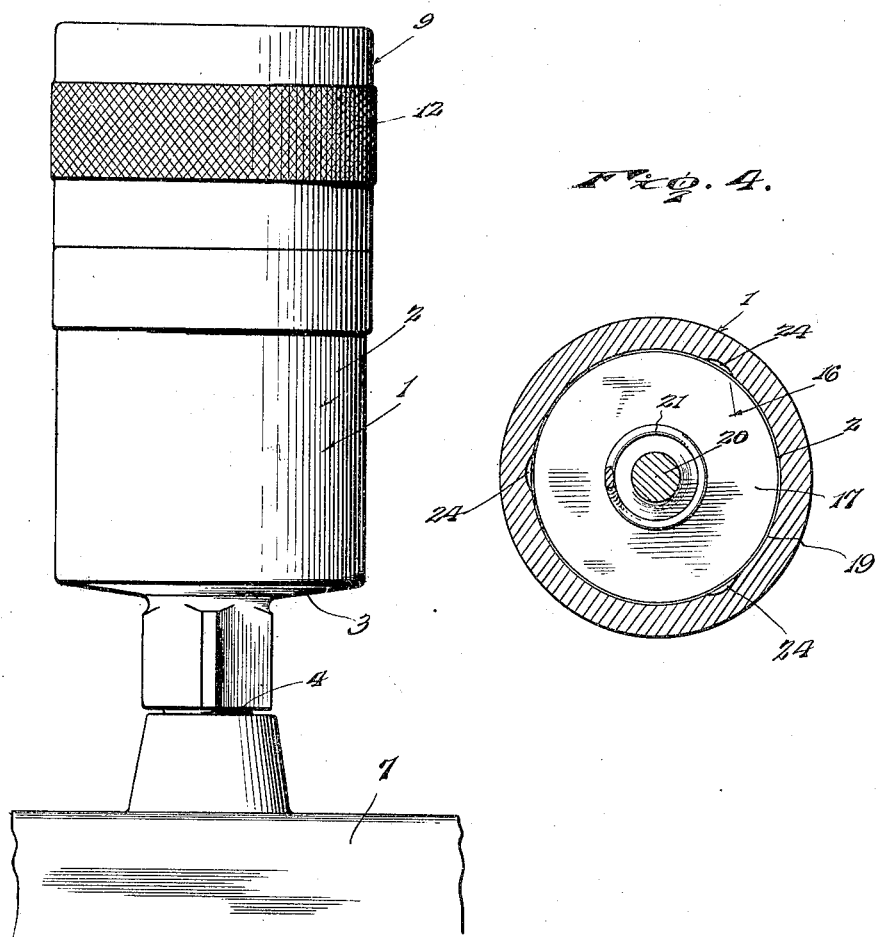
Inventor
J.N. Clore.
By Lacey Lacey, Attorneys

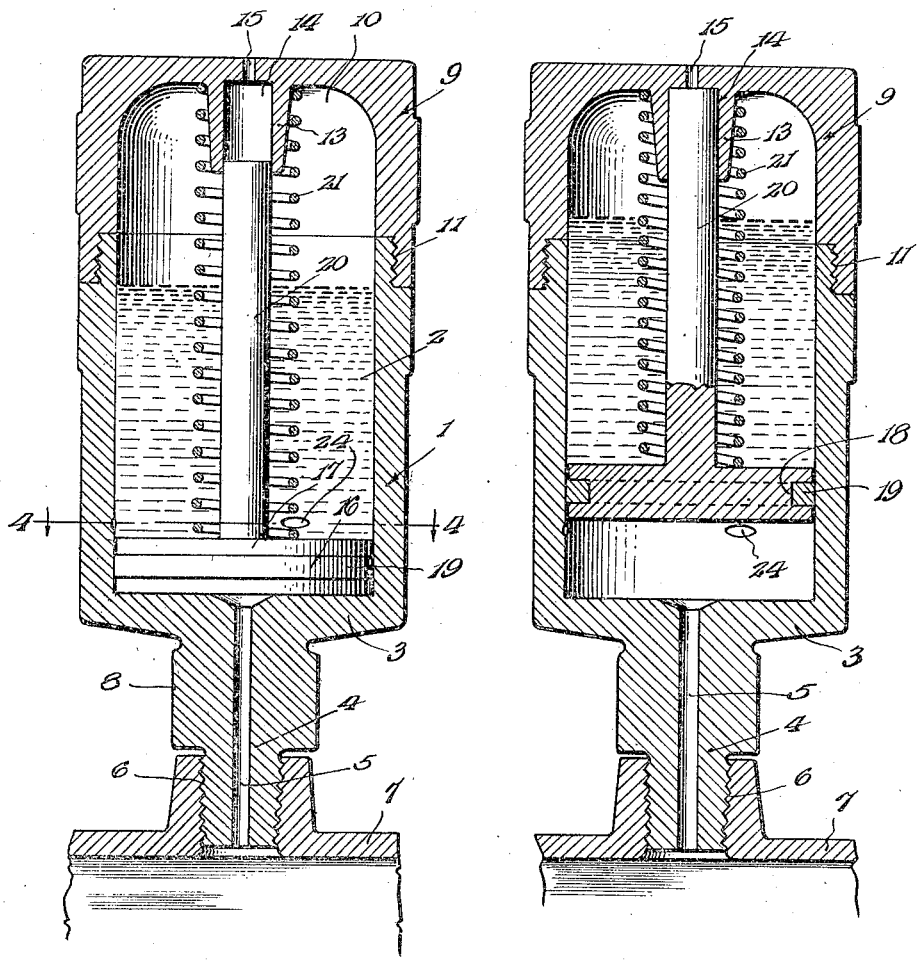

Patented Aug. 11, 1925.

1,548,869

UNITED STATES PATENT OFFICE.

JOHN N. CLORE, OF ROANOKE, VIRGINIA.

LUBRICATING DEVICE.

Application filed March 18, 1924. Serial No. 700,072.

*To all whom it may concern:*

Be it known that I, JOHN N. CLORE, a citizen of the United States, residing at Roanoke, in the county of Roanoke and State of Virginia, have invented certain new and useful Improvements in Lubricating Devices, of which the following is a specification.

This invention relates to improvements in lubricating devices and while the device embodying the invention is designed more particularly for use in connection with air or steam compressors, it may be employed in other connections.

Compressors do not require a great amount of lubrication but it is essential that lubricant be supplied thereto in properly regulated quantities so that the parts of the compressor will function without any undue friction and yet there will not be an excess of lubricant supplied thereto. The present invention therefore has as its primary object to provide a lubricating device which will operate automatically to supply lubricant in regulated quantity to a compressor upon which it is installed, the amount of lubricant supplied being so regulated that it is no more than is necessary to properly lubricate the parts.

Another object of the invention is to provide a lubricating device which will supply lubricant to the compressor in quantity regulated by the speed of operation of the compressor, a predetermined small quantity of lubricant being supplied at each cycle of operation of the compressor piston.

Another object of the invention is to provide a lubricator which will be positive and certain in its action and be automatically actuated through the operation of the compressor piston on its compression and return stroke without the employment of mechanical connections.

Another object of the invention is to provide a lubricating device which, in its operation, will require no especial care except replenishment of the lubricant, and in this connection the invention contemplates so constructing the device as to make allowance for carelessness on the part of the attendant if an excessive amount of lubricant should be introduced into the cylinder of the device.

Another object of the the invention is to so construct the device that, in an extremely simple manner, it may be determined whether or not the device is functioning properly.

In the accompanying drawings:

Figure 1 is a view in elevation of the lubricating device embodying the present invention;

Figure 2 is a vertical diametrical sectional view therethrough, the piston of the device being shown in full lowered position as at the end of the down stroke of the piston of the compressor;

Figure 3 is a view similar to Figure 2 illustrating the piston of the device elevated as upon the compression stroke of the compressor piston and immediately preceding its return stroke;

Figure 4 is a horizontal sectional view taken substantially on the line 4—4 of Figure 2 looking in the direction indicated by the arrows.

The device embodying the invention comprises a lubricant containing cup indicated in general by the numeral 1 and having a smooth cylindrical bore 2, the cup being provided with a closed bottom 3 and the said bottom being formed with a neck or stem 4 having a lubricant conducting bore 5 formed axially therein, the said bore at its upper end communicating with the bore 2 of the cup 1. The neck or stem 4 is provided with a threaded lower extremity 6 adapting the device to be fitted into the head 7 of the cylinder of a compressor in lieu of the ordinary lubricating cup. Above the threaded portion 6 the neck or stem 4 is provided with a polygonal portion 8 for the application of a wrench whereby the neck may be threaded into the said head of the cylinder of the compressor.

The cup 1 is closed at its top by a cap 9 which is recessed interiorly, as at 10, the wall of the recess being cylindrical so as to constitute a continuation of the wall of the bore 2 of the cup 1 when the cap is fitted to the said cup, the cap and the cup being threaded, as at 11, to provide for connection of the parts. Exteriorly the cup 1 and the cap 9 may be finished in any manner desired, the cap 9 being preferably provided with a roughened surface 12 to permit of its more ready application to and removal from the cup 1.

The cap 9 is closed at its top and is provided upon the under side of its closed top with a depending nipple 13 provided with a cylindrical bore 14, the bore of the nipple being in axial alinement with the bore of the cup 1 and the bore 5 of the neck 4. For a purpose to be presently explained, an opening 15 of relatively small diameter is formed through the closed top of the cap 9 and is in axial alinement with the bore 14 of the nipple 13. The numeral 16 indicates in general a piston comprising a head 17 of a diameter to fit within the bore 2 of the cup 1 and provided with a circumscribing groove 18 in which is arranged a packing ring 19 so as to provide a substantially fluid-tight fit between the piston and the wall of the bore of the cup. The piston further includes a stem indicated by the numeral 20, and this stem at its upper end works in the bore 14 of the nipple 13, so that the piston, in its up and down reciprocatory motion within the cup 1, will be suitably guided. The numeral 21 indicates a compression spring which at its upper end fits over the nipple 13 and at its lower end bears against the upper side of the head 17 of the piston, the said spring enclosing the stem 20 of the piston and constantly exerting a downward thrust upon the piston as a whole.

At this point it will be evident that on the up stroke of the piston of the compressor, pressure will be imposed upon the under side of the head of the piston 16, thus causing the piston to move upwardly in the bore 2 until the stem of the piston seats at its upper end in the upper end of the bore 14 of the nipple 13. In the upward movement of the piston 16, the body of lubricant within the cup 1 will be carried upwardly, owing to the fluid-tight fit of the packing ring 19 against the wall of the bore 2 of the said cup. Likewise in the upward movement of the piston, the spring 21 will be compressed, On the down or return stroke of the piston of the compressor, the pressure against the under side of the head of the piston 16 will be relieved and a suction created resulting in the downward movement of the piston until it assumes substantially the position shown in Figure 2 of the drawings, the spring 21 expanding at this time to assist in the downward movement of the said piston.

In order that, upon the downward stroke of the piston of the lubricator, a predetermined quantity of lubricant may be supplied to the cylinder of the compressor through the bore or passageway 5 in the neck of the cup 1, lubricant receiving and retaining pockets 22 are formed in the wall of the bore 2 at a point suitably spaced above the closed bottom 3 of the cup 1. These pockets, in the present instance, are illustrated as three in number and they are equi-distantly spaced circumferentially about the wall of the said bore 3. Likewise it will be observed that the pockets are relatively shallow and comparatively short so that their capacity is more or less limited. However, these pockets may be formed of any desired depth, width, or length, depending upon the quantity of lubricant to be delivered to the compressor cylinder at each cycle of operation thereof, and likewise that the pockets may be increased or decreased in number, the capacity and number of the pockets being increased or decreased in accordance with the amount of lubricant it is found necessary to supply to the compressor at each cycle of operation thereof. Referring now to Figure 2 of the drawings it will be observed that when the piston 16 is in full lowered position as, for example, on the down stroke of the piston of the compressor, the upper side of the head 17 of the piston will occupy a plane precisely below the plane in which the pockets 24 are located so that lubricant will fill these pockets. As heretofore stated, upon the compression stroke of the piston of the compressor, the piston 16 will be moved upwardly until the upper end of its stem contacts the under side of the closed top of the cap 9 at the upper end of the bore 14 of the nipple 13. At thise time the piston will assume substantially the position shown in Figure 3 of the drawings and it will be evident that as the periphery of the piston passes the pockets 24, the lubricant which has entered these pockets in the lowered position of the piston, will be trapped. In the elevated position of the piston, as will be evident by reference to Figure 3, the under side of the piston head 17 is located in a plane above the pockets 24 so that the pockets are then uncovered and the lubricant which has been trapped therein is free to escape. Inasmuch as on the down stroke of the piston of the compressor, a suction is created within the cylinder of the compressor as well as in the lower portion of the cup 1, the pockets 24 will be completely evacuated of lubricant and the lubricant will be drawn by suction through the bore 5 upon the beginning of the down stroke movement of the piston of the compressor, any lubricant which might otherwise remain in the lower portion of the cup being discharged by the pressure created when the piston 16 is forced downwardly by the spring 21 and through release of pressure upon the under side of its head.

From the foregoing description of the invention it will be understood that the piston 16 is automatically reciprocated at each cycle of operation of the compressor upon which the lubricating device is installed, and that in the reciprocation of the said piston 16, and at each cycle of operation of the compressor, a predetermined quantity of lubricant is supplied to the compressor cylinder, the quantity being determined by the dimensions and number of the pockets 24.

Inasmuch as the cap 9 is hollow or formed interiorly with the recess 10, it is immaterial if an attendant is careless in filling the cup 1 with lubricant, for even if he should fill the cup substantially to overflowing, the upstroke of the piston 16 would not be interfered with because of the additional space provided by the recess 10 above the level of the lubricant within the cup.

By providing the opening 15 in the top of the cap 9, the attendant may readily determine if the lubricating device is functioning properly, by inserting a piece of wire or other slender element through the opening to rest upon the upper end of the stem 20, noting whether or not this inserted element is reciprocated.

Having thus described the invention, what is claimed as new is:

1. A lubricating device comprising a cup having a bore, a piston working in the bore and constituting means for supporting a body of lubricant contained in the cup above the piston, and a trapping pocket in the wall of the bore in the path of travel of the periphery of the piston.

2. A lubricating device comprising a cup having a bore, a piston working in the bore and constituting means for supporting a body of lubricant contained in the cup above the piston, and a lubricant trapping pocket in the wall of the bore in the path of travel of the periphery of the piston.

3. A lubricating device comprising a cup having a bore, a piston working in the bore and constituting means for supporting a body of lubricant contained in the cup above the piston, and a lubricant trapping pocket in the wall of the bore in the path of travel of the periphery of the piston, the stroke of the piston being so regulated and the pocket being so located as to effect uncovering of the pocket at the limit of the reciprocating movement of the piston.

4. A lubricating device comprising a cup having a bore, a piston working in the bore and constituting means for supporting a body of lubricant contained in the cup above the piston, and means operative upon reciprocation of the piston to trap a predetermined quantity of the lubricant from the upper portion of the cup and deliver the same to the lower portion thereof beneath the piston.

5. A lubricating device comprising a cup having a bore, a piston working in the bore and constituting means for supporting a body of lubricant contained in the cup above the piston, the cup having an outlet leading from its lower portion beneath the piston, a pocket in the wall of the bore spaced above the bottom of the cup a distance greater than the thickness of the head of the piston, and means for limiting the upward movement of the piston to an extent to provide for uncovering of the said pocket at a point below the head of the piston at the limit of said stroke.

6. A lubricating device for compressors comprising a cup having a bore, a piston working in the bore and constituting means for supporting a body of lubricant contained in the cup above the piston, the cup having means upon its bottom providing for its connection with the compressor in communication with the cylinder thereof whereby the compression stroke of the compressor piston will effect upward movement of the piston of the said device and whereby the suction stroke will effect downward movement of the piston of the device, and a by-pass in the wall of the bore in the path of travel of the periphery of the said piston of the device.

7. A lubricating device for compressors comprising a cup having a bore, a piston working in the bore and constituting means for supporting a body of lubricant contained in the cup above the piston, the cup having means upon its bottom providing for its connection with the compressor in communication with the cylinder thereof whereby the compression stroke of the compressor piston will effect upward movement of the piston of the said device and whereby the suction stroke will effect downward movement of the piston of the device, a by-pass in the wall of the bore in the path of travel of the periphery of the said piston of the device, and a spring urging the piston in downward direction.

8. A lubricating device comprising a cup having a bore, a closure for the upper end of the cup, a nipple depending from the under side of the closure and having a bore, a piston working in the bore of the cup and having a stem working at its upper end in the bore of the nipple, the said closure for the cup having an opening communicating with the bore of the nipple and in alinement with the axis of the piston stem, the piston constituting means for supporting a body of lubricant contained in the cup above the piston, and a by-pass in the wall of the bore in the path of travel of the periphery of the piston.

In testimony whereof I affix my signature.

JOHN N. CLORE. [L. S.]